(12) United States Patent
McCanny et al.

(10) Patent No.: US 6,202,148 B1
(45) Date of Patent: Mar. 13, 2001

(54) COMMUTATOR CIRCUIT

(75) Inventors: John Vincent McCanny, Newtownards (GB); Tiong Jiu Ding, Perak (MY); Yi Hu, Belfast (GB)

(73) Assignee: Integrated Silicon Systems Limited, Belfast (GB)

( * ) Notice: Subject to any disclaimer, the term of this patent is extended or adjusted under 35 U.S.C. 154(b) by 0 days.

(21) Appl. No.: 09/183,770

(22) Filed: Oct. 30, 1998

(30) Foreign Application Priority Data

Oct. 31, 1997 (GB) .................................................. 9722982

(51) Int. Cl.$^7$ ...................................................... G06F 9/445
(52) U.S. Cl. ................................ 713/1; 713/100; 712/229
(58) Field of Search ................................... 713/1, 2, 100, 713/401, 600; 712/8, 15, 200, 225, 222, 229, 17

(56) References Cited

U.S. PATENT DOCUMENTS

| | | | | |
|---|---|---|---|---|
| 3,644,027 | * | 2/1972 | Bennett ................................. | 353/25 |
| 3,899,667 | * | 8/1975 | Simone ................................. | 235/156 |
| 4,127,805 | * | 11/1978 | Lukashov et al. .................... | 323/120 |
| 4,366,738 | * | 1/1983 | Howell ................................. | 84/1.01 |
| 4,928,068 | * | 5/1990 | Main ..................................... | 329/324 |
| 5,347,548 | * | 9/1994 | Messerges et al. ................... | 375/116 |
| 5,497,263 | * | 3/1996 | Masuda et al. ....................... | 327/278 |
| 5,517,493 | * | 5/1996 | Uekama et al. ...................... | 370/58.1 |
| 5,724,278 | * | 3/1998 | Ohgose et al. ........................ | 708/401 |
| 5,838,817 | * | 11/1998 | Funada .................................. | 382/166 |

* cited by examiner

Primary Examiner—Thomas C. Lee
Assistant Examiner—Rijue Mai
(74) Attorney, Agent, or Firm—Curtis L. Harrington

(57) ABSTRACT

A commutator circuit has a plurality of stages connected in series, each stage having a plurality of data inputs and a like plurality of data outputs with the data outputs of each stage being connected in one-to-one correspondence to the data inputs of the next stage. Each stage includes a plurality of data transposition circuits each connected between a respective pair of the data inputs and a respective pair of the data outputs for that stage. Each data transposition circuit includes two 2-to-1 selector switches each having two inputs connected to respective ones of the pair of data inputs and a single output connected to a respective one of the pair of data outputs, a first delay element connected between one of the data inputs and the two selector switches, and a second delay element connected to the output of one of the selector switches. The commutator circuit also includes an input for synchronizing signals and a counter associated with each stage for deriving from the synchronizing signals a control signal for the selector switches of that stage.

5 Claims, 8 Drawing Sheets

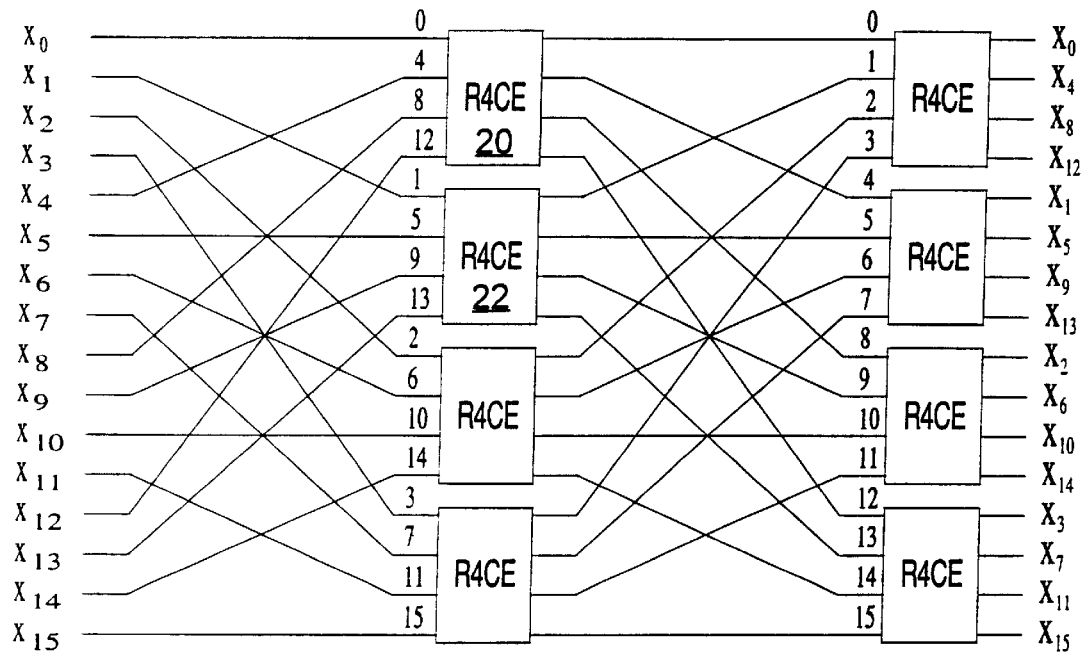

Fig. 2a $$A \qquad B \qquad C \qquad D$$

$$\begin{bmatrix} x0 & x4 & x8 & x12 \\ x1 & x5 & x9 & x13 \\ x2 & x6 & x10 & x14 \\ x3 & x7 & x11 & x15 \end{bmatrix}^T = \begin{bmatrix} \begin{bmatrix} x0 & x4 \\ x1 & x5 \end{bmatrix}^T & \begin{bmatrix} x8 & x12 \\ x9 & x13 \end{bmatrix}^T \\ \begin{bmatrix} x2 & x6 \\ x3 & x7 \end{bmatrix}^T & \begin{bmatrix} x10 & x14 \\ x11 & x15 \end{bmatrix}^T \end{bmatrix}^T = \begin{bmatrix} \begin{bmatrix} x0 & x1 \\ x4 & x5 \end{bmatrix} & \begin{bmatrix} x8 & x9 \\ x12 & x13 \end{bmatrix} \\ \begin{bmatrix} x2 & x3 \\ x6 & x7 \end{bmatrix} & \begin{bmatrix} x10 & x11 \\ x14 & x15 \end{bmatrix} \end{bmatrix} = \begin{bmatrix} x0 & x1 & x2 & x3 \\ x4 & x5 & x6 & x7 \\ x8 & x9 & x10 & x11 \\ x12 & x13 & x14 & x15 \end{bmatrix}$$

Fig. 2b

COMMUTATOR CIRCUIT

FIELD OF THE INVENTION

The present invention relates to a commutator circuit. In particular, the present invention relates to a commutator circuit for reorganizing sequences of digital data between computational processing stages of a hardware digital processing system.

BACKGROUND OF THE INVENTION

In many areas of digital signal and image processing there is a need to reorganize sequences of digital data between the computational processing stages of a digital processing system. One particularly important area is in the computation of fast Fourier transforms. The fast Fourier transform (FFT) is a well known mathematical algorithm for performing Fourier transform operations. The Fourier transform is widely used in Digital Signal Processing (DSP) applications to determine the frequency spectral content of digital signals or data. Similar digital data reorganization is also required in the computation of other mathematical operations such as the discrete cosine and sine transforms and in many image processing applications where computations are first performed on a row of pixels followed by a column of pixels or vice versa.

Such mathematical operations, including the FFT, are often implemented in hardware. When so implemented, the data reorganization is commonly effected using a commutator circuit. Existing commutator circuits are, however, application specific. For example, in the case of an FFT processor, which would comprise a number of commutator circuits, each commutator circuit is individually devised according to a number of application requirements such as: the size of the transform; the data word-lengths; the data word-widths; and the level of pipelining in the FFT processor. The transform size relates to the number of data samples in one data block, or data set, and is commonly expressed as the 'point' of the transform. Furthermore, there are a considerable number of known algorithms which may be used to implement any particular FFT and the structure of the commutator circuit is also dependent on which algorithm is used for the application in question. It will be appreciated therefore, that there are a considerable number of permutations of factors which determine the structure of the commutator circuit. Conventionally, once a commutator circuit is designed in accordance with a particular combination of application requirements, the circuit is dedicated for use with that particular combination of requirements. The design of commutator circuits for an FFT processor by conventional methods is a labour intensive procedure, typically requiring months of design time.

It is an object of the present invention to provide a commutator circuit based on a generalised commutator architecture characterised by a set of parameters, which commutator architecture allows a commutator circuit to be constructed for any specific application requirements upon selection of the values of said parameters to suit said specific application requirements.

SUMMARY OF THE INVENTION

Accordingly, the present invention provides a commutator circuit comprising at least one data transposition circuit connected between a pair of data inputs and a pair of data outputs, the data transposition circuit including two 2-to-1 selector switches each having two inputs connected to respective ones of the pair of data inputs and a single output connected to a respective one of the pair of data outputs, and a delay element connected in series with one of the data inputs and/or one of the data outputs, the commutator circuit further comprising an input for synchronizing signals and means for deriving from the synchronizing signals a control signal for the selector switches. The commutator circuit comprises a plurality of stages connected in series, each stage having a plurality of data inputs and a like plurality of data outputs with the data outputs of each stage except the last being connected in one-to-one correspondence to the data inputs of the next stage, and wherein each stage comprises a plurality of the said data transposition circuits each connected between a respective pair of the data inputs and a respective pair of the data outputs for that stage, the commutator circuit further comprising means associated with each stage for deriving from the synchronizing signals a control signal for the selector switches of that stage.

Preferably, in at least one stage each data transposition circuit includes a first delay element connected between one of the data inputs and the two selector switches, and a second delay element connected to the output of one of the selector switches.

Preferably, a synchronizing signal is supplied to the first stage each time a fresh set of data is present at the data inputs of the first stage, wherein the synchronizing signal is passed from each stage to the next via a further delay element, and wherein each stage includes a counter which counts the synchronizing signals and provides a control signal for the selector switches of that stage according to the state of the counter.

Preferably, the commutator circuit further includes means for re-mapping the data outputs of each stage to the data inputs of the next stage.

The invention further provides an FFT processor including at least one commutator circuit as claimed in any preceding Claim.

For the purposes of this specification a 2-to-1 selector switch is any device, such as the 2-to-1 multiplexers mentioned herein, which permits either one of two data inputs to be selectively connected to a single data output as determined by an applied control signal.

BRIEF DESCRIPTION OF THE DRAWINGS

Embodiments of the invention will now be described by way of example and with reference to the accompanying diagrams in which:

FIG. 2a is a 16-point FFT signal flow graph;

FIG. 2b is an illustration of a 4×4 matrix transform;

FIG. 5b is an alternative view of the generalised commutator architecture of FIG. 5a;

FIG 6 is a block diagram of a generalised commutator module based on the architecture of FIG. 5a;

FIG. 8b is an alternative schematic view of the multi-stage commutator circuit of FIG. 8a.

DETAILED DESCRIPTION OF THE INVENTION

Figure 1:
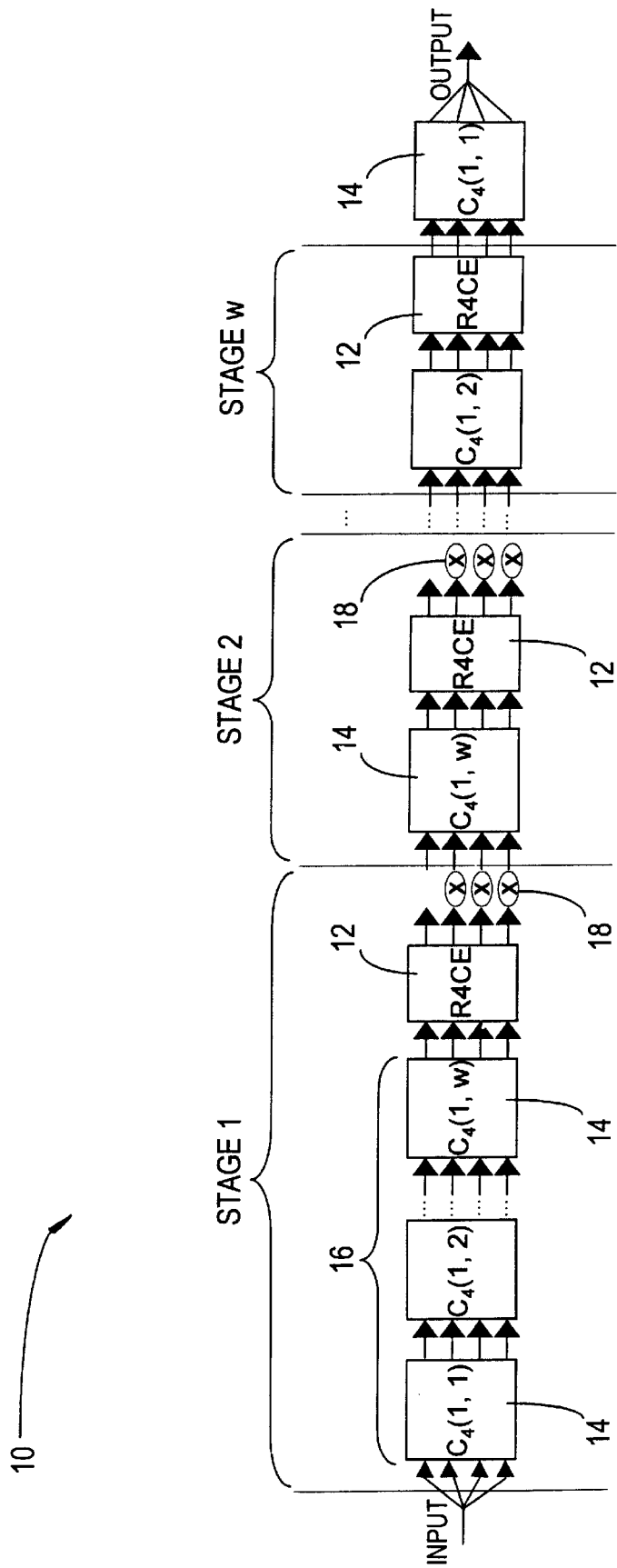
FIG. 1 is a schematic view of an FFT processor adapted for use with the commutator circuit according to the present invention.

With reference to FIG. 1, there is shown a schematic view of an FFT processor, generally indicated at 10. The FFT processor comprises a pipelined linear array of computational processors 12, in the form of radix-4 computational elements R4CE, interspersed with commutator circuits 14 according to the present invention. The FFT processor 10 is adapted to perform a radix 4 decimation-in-frequency (DIF) N-point FFT computation, where N is the size of the FFT transform. Input data (not shown) and processor bandwidth are matched by breaking down input data words which comprise B bits into digits which are B/4 bits wide. These digits are then operated on sequentially in four clock cycles. In general, the FFT processor 10 comprises w=$\log_4 N$ stages, with each stage containing a radix 4 computational element (R4CE) 12 and at least one commutator circuit 14. Depending on the application, each stage may, but does not necessarily, comprise one or more complex multipliers 18. In FIG. 1, each stage except stage w comprises three complex multipliers 18. The FFT processor 10 operates on complex bit parallel data input and produces output results (also bit parallel) with data in reverse order. The data is internally re-organised and processed in a digit serial manner. Each processing stage therefore operates on 4 parallel digit-serial streams, each B/4 bits wide, where B is the word size (in general r streams, each B/r bits wide, where r is the radix). This organisation significantly reduces the wiring overhead when compared with a full bit parallel data organisation, particularly for large wordlengths. It reduces the hardware requirement to approximately one quarter that of known FFT processors (not shown) and also allows 100% processor utilisation to be achieved.

The FFT processor 10 is, at the schematic level illustrated, similar to known FFT processors (not shown) in that it comprises a pipelined linear array of computational processors 12 interspersed with commutator circuits 14.

The commutator circuits 14 perform the function of reorganizing data as it flows through the processor 10. The data reorganization comprises both reordering and delaying data values with respect to one another. Unlike known commutator circuits, however, the commutator circuits 14 comprise at least one commutator module (not shown in FIG. 1, but described later with respect to FIGS. 5a, 5b, 6 and 7), the architecture of which is independent of the type or size of FFT computation to be performed and of the format of the data which flows through the FFT processor 10. The architecture of the commutator module is, however, characterised by a set of parameters the values of which are set in accordance with the specific application requirements. The commutator module and its use in constructing commutator circuits 14 will be described in greater detail below.

The function of a commutator circuit in general can be understood with reference to FIGS. 2a and 2b. Fast Fourier transform algorithms are often represented in the form of signal flow graphs. These are well known and present a diagrammatic representation of the mathematical computation required. In general, an FFT processor is a means of implementing the computations explicit in a signal flow graph in hardware. Because there are many different ways of implementing FFT algorithms, there are also many different FFT flow graphs. However, these are typically characterised by the fact that, in each, the FFT computation is broken down into stages comprising computational units to perform lower radix computations (typically radix-2 or radix-4 computations) with data reorganization required at each stage of the computation. FIG. 2a shows one example of a signal flow graph for a 16-point FFT implemented using computational processors 12 in the form of radix-4 computational elements R4CE. It will be noted that, rather than performing a radix-16 computation, the signal flow graph performs the 16-point FFT computation in two stages, each stage comprising four radix-4 computational elements.

The input data values, $x_i$ (i=0, 1, ... 15) are shown at the extreme left of the signal flow graph, while the output data (frequency content values), $X_i$, are shown at the extreme right of the flow graph. The required flow of the data from input to output is shown (using only the indicies of the data values) at the left of the radix-4 computational elements R4CE at each stage. In this flow graph it is assumed that data is available in natural order i.e. the order in which they are sampled ($x_0, x_1, x_2, x_3, x_4$ etc). The computational element R4CE indicated at 20 operates on the data values $x_0, x_4, x_8$, and $x_{12}$. Similarly, the data values $x_1, x_5, x_9$ and $x_{13}$ are required at the computational element R4CE denoted as 22 and so on. FIG. 2a therefore illustrates which data values are required at each radix-4 computational element R4CE. When implementing such a signal flow graph in hardware, the function of the commutator circuit is to perform the requisite reorganization of the data before each stage of computational elements R4CE.

The function of the data reorganization is basically that of a matrix transposition. This can be readily appreciated with reference to FIG. 2b. The input data values $x_i$ (i=0, 1, ... 15) can be depicted in the form of a 4×4 matrix as illustrated in matrix A. If the reordered data required at the next stage of computational elements is similarly arranged in the form of a 4×4 matrix, then matrix D is produced. It can be seen that matrix D is the matrix transpose of matrix A. By considering matrices B and C it can further be appreciated that the transposition of matrix A can be performed in two stages and in terms of 2×2 matrices. In general, an N×N matrix transposition (where N is a power of two) can be decomposed hierarchically and implemented in terms of simple 2×2 matrix transpose operations.

It is observed, then, that a commutator circuit can be constructed from a commutator module which performs 2×2 matrix transpositions, irrespective of the number of input data values and independently of what those data values represent. In the case of an FFT processor, this means that such a commutator module is independent of transform size and the data format used in the processor.

Figure 3A:
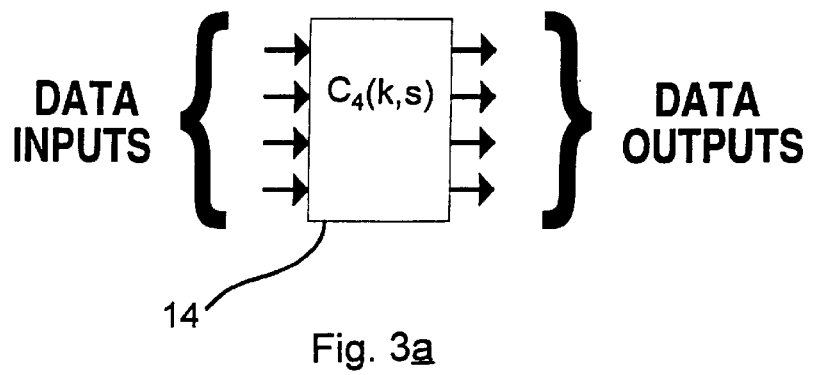
FIG. 3a a block diagram of a radix-4 commutator circuit according to the present invention.
Figure 3B:
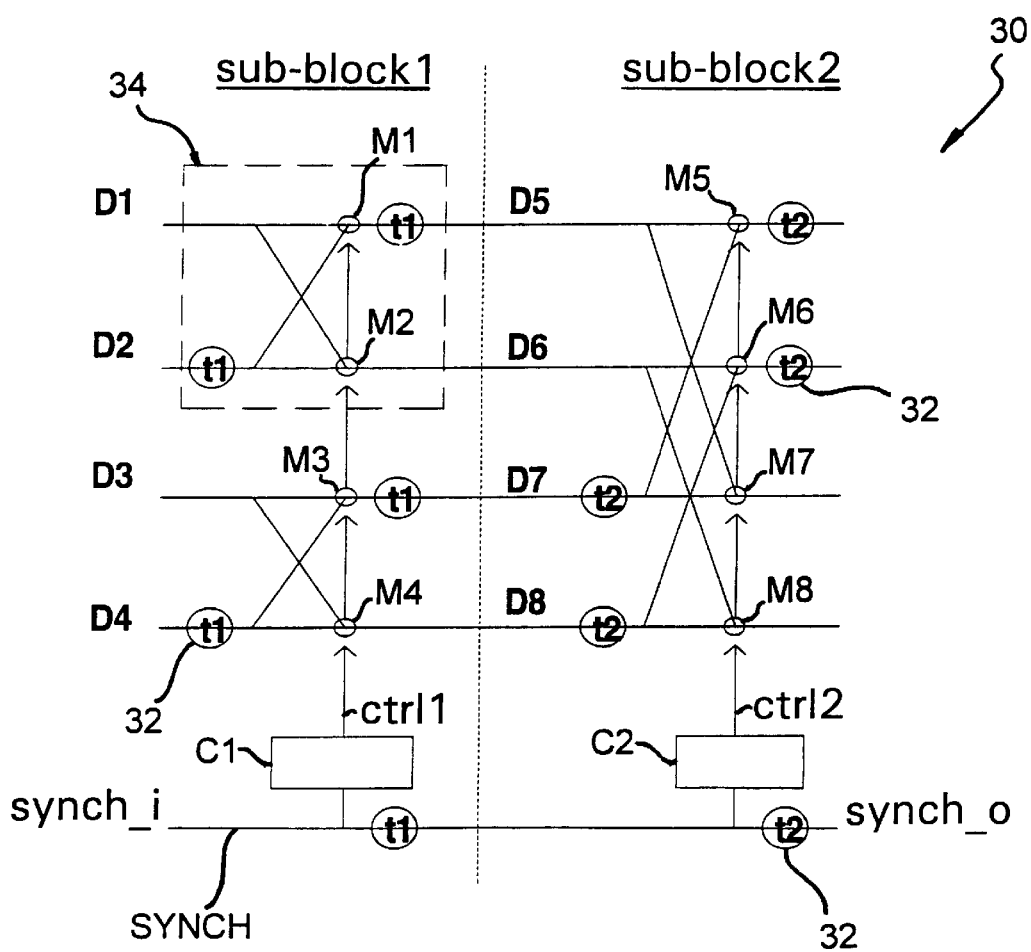
FIG. 3b is a schematic view of a radix-4 commutator circuit, constructed using a generalised commutator architecture, according to the present invention.
Figure 4A:
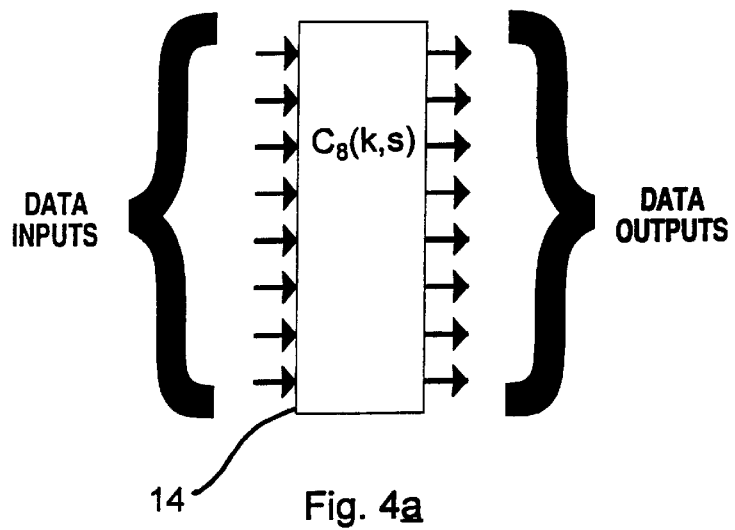
FIG. 4a is a block diagram of a radix-8 commutator circuit according to the present invention.
Figure 4B:
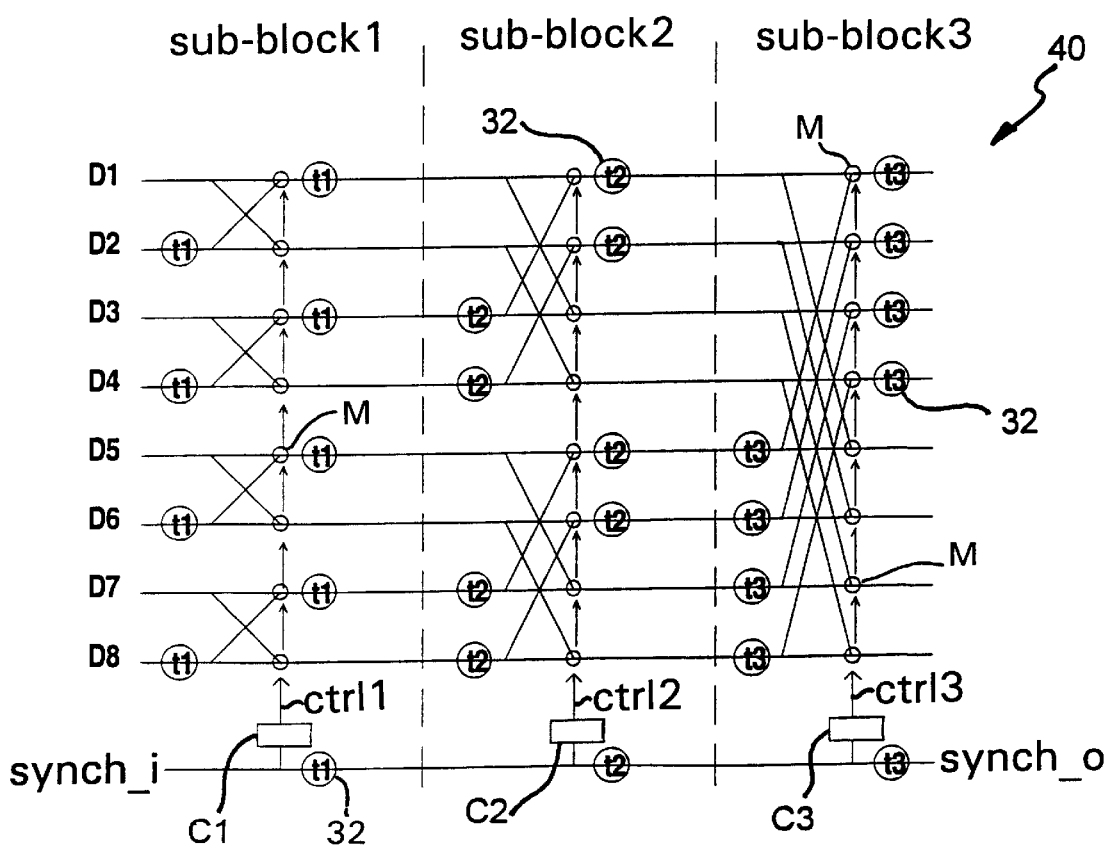
FIG. 4b is a schematic view of a radix-8 commutator circuit, constructed using the generalised commutator architecture, according to the present invention.
Figure 5A:
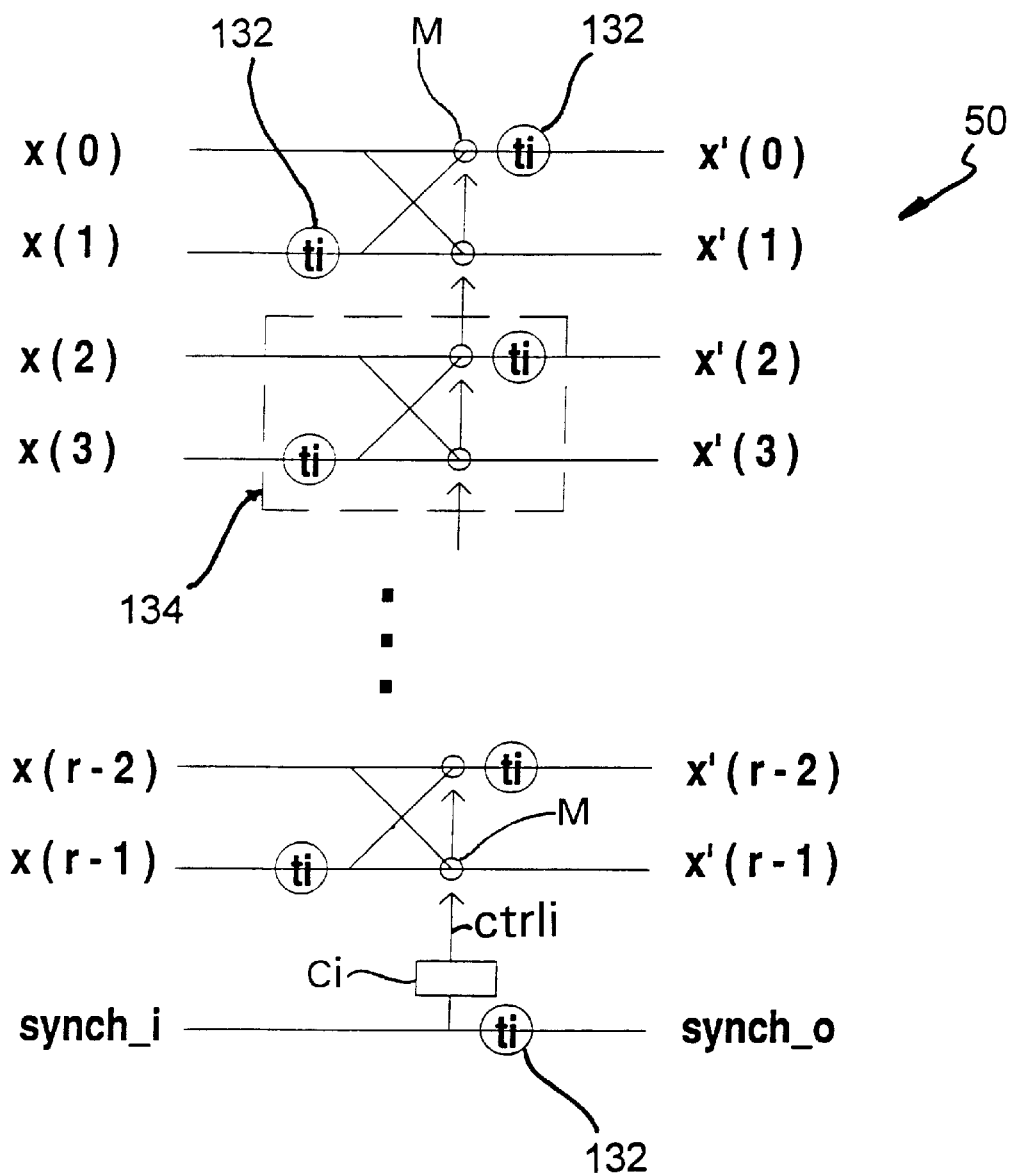
FIG. 5a is a schematic view of a generalised commutator architecture according to the present invention.
Figure 5B:
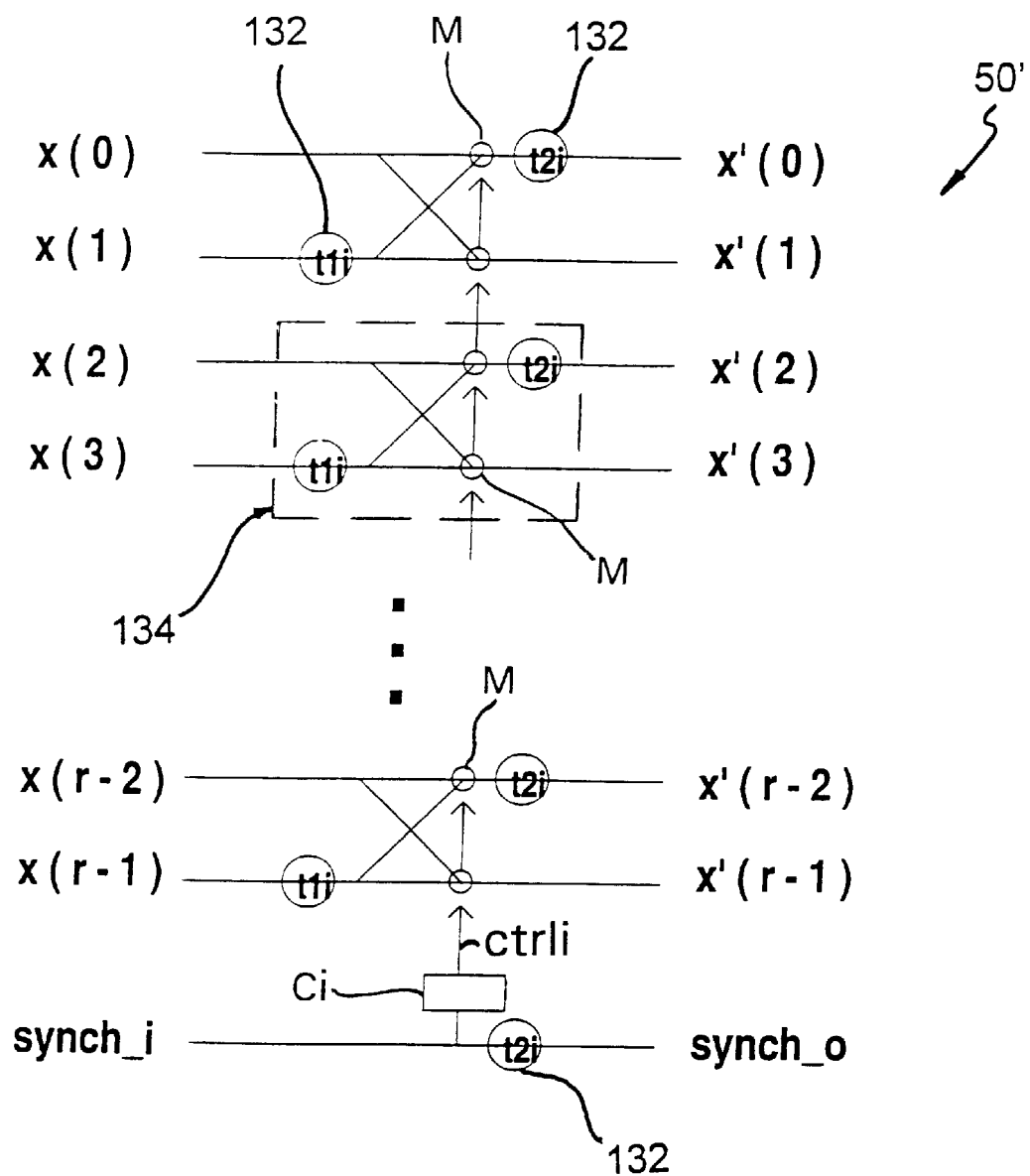

The generalised commutator architecture according to the present invention is illustrated in FIGS. 5a and 5b. The generalised architecture will be more readily understood, however, with reference to two specific examples which are described with reference to FIGS. 3a and 3b and FIGS. 4a and 4b. FIG. 3a shows a block diagram of radix-4 FFT commutator circuit 14 denoted by $C_4(k,s)$ where the subscript '4' refers to the radix (in general radix=r and the commutator circuit 14 can be denoted as $C_r(k,s)$), and k and s are parameters which characterise the circuit and which will be described in greater detail below. The circuit $C_4(k,s)$ has four data inputs and four data outputs. Depending on the application, each data input and data output accepts either single bit data, digit-serial data or digit-parallel data, where a digit comprises a plurality of bits. FIG. 3b is a schematic view of the architecture, generally indicated at 30, of the commutator circuit of FIG. 3a, which architecture 30 is based on the generalised commutator architecture of the present invention. The architecture 30 is illustrated as having two stages, referred to herein as sub-blocks, denoted as sub-block 1 and sub-block 2, separated by a notional broken line. Sub-block 1 and sub-block 2 each comprise four input data lines, D1–D4 and D5–D8 respectively, and a synchronizing signal line SYNCH. It will be appreciated that the input data lines D5–D8 are the data output lines of sub-block 1 corresponding respectively with input data lines D1–D4. Within each sub-block, there are four 2-to-1 multiplexers M1–M4 and M5–M8 respectively. Sub-block 1 has a up-counter C1 and sub-block 2 has a up-counter C2. Bit [ctr11] (i.e. the ctr11$^{th}$ bit, where ctr11 is an integer value calculated in accordance with equation [3] below) of counter C1, denoted in FIG. 3b as ctr11, is used as the control input to each multiplexer M1–M4 in sub-block 1. Similarly, in sub-block 2, bit [ctr12] of counter C2, denoted in FIG. 3b as ctr12, is used as the control input to each multiplexer M5–M8. The synchronizing signal line SYNCH provides the input to the counters C1 and C2. In sub-block 1, data lines D1 and D2 are the selectable inputs of both multiplexers M1 and M2 while data lines D3 and D4 are the selectable inputs of both multiplexers M3 and M4. The arrangement is such that, when bit [ctr11] is not set, data lines D1, D2, D3 and D4 are respectively selected as the inputs of multiplexers M1, M2, M3 and M4. When bit [ctr11] is set, data lines D2, D1, D4 and D3 are respectively selected as the inputs of multiplexers M1, M2, M3 and M4. In sub-block 2, data lines D5 and D7 are the selectable inputs of both multiplexers M5 and M7 while data lines D6 and D8 are the selectable inputs of both multiplexers M6 and M8. The arrangement is such that, when bit [ctr12] is not set, data lines D5, D6, D7 and D8 are respectively selected as the inputs of multiplexers M5, M6, M7 and M8. When bit [ctr12] is set, data lines D7, D8, D5 and D6 are respectively selected as the inputs of multiplexers M5, M6, M7 and M8.

The architecture 30 further comprises a number of delay elements 32 which have a delay value (i.e. number of unit delays) of either t1 or t2. In sub-block 1, respective delay elements 32 of value t1 are located in data line D1 after the multiplexer M1, in data line D2 before both multiplexers M1 and M2, in data line D3 after the multiplexer M3, in data line D4 before both multiplexers M3 and M4 and in the synchronizing signal line SYNCH after the counter C1. In sub-block 2, respective delay elements 32 of delay value t2 are located in data lines D5 and D6 after the multiplexers M5 and M6 respectively, in data line D7 before the multiplexers M5 and M7, in data line D8 before the multiplexers M6 and M8 and in the synchronizing signal line SYNCH after the counter C2. The delay values t1 and t2 depend on application parameters as described below.

Thus, the architecture 30 is capable of reordering and delaying four input data streams (not shown) with respect to one another. The reordering is controlled by the multiplexers M1–M8 and the delaying is performed by the delay elements 32.

The flow of data through the architecture 30 is controlled by a conventional system clock (not shown) while the counters C1 and C2 are controlled by a synchronizing or synchronization signal synch_i, which is normally, but not necessarily, pipelined via delay elements 32 through the synchronizing signal line SYNCH and output as signal synch_o. The synchronization signal synch_i is provided to indicate the start of each new input data block or data set. In the present embodiment, the synch_i signal is set to logic high at the start of a new data block and is then set to logic low for the duration of that data block. It will be appreciated that in alternative embodiments of the invention (not illustrated) the synchronization signal may take alternative forms. Thus, data blocks of an arbitrary size can be accommodated by the commutator circuit 14, which data blocks need not necessarily arrive at regular intervals. The commutator circuit 14 can therefore accommodate a continuous flow of data blocks with an arbitrary number of clock cycles between each block—this is an important requirement in many video applications.

Also, the conventional system clock which controls the flow of data through the architecture 30 (and through the commutator circuit in general) need not necessarily be a regular clock—the commutator circuit of the invention is thus suitable for use in asynchronous systems.

FIGS. 4a and 4b show respectively a block diagram and a schematic view of a radix-8 FFT commutator circuit. FIG. 4b shows an architecture 40 which is of similar construction to the architecture 30. In this case, the architecture 40 comprises three stages or sub-blocks, sub-block 1, sub-block 2 and sub-block 3 and has eight input data lines D1–D8. In sub-block 3, the delay elements 32 have a delay value t3 and the multiplexers (indicated at M) are controlled by bit [ctr13] (indicated at ctr13) of an up-counter C3. The architecture 40 is capable of reordering and delaying eight input data streams (not shown) with respect to one another.

It will be appreciated from FIG. 3b that the only difference between sub-block 1 and sub-block 2 is the wiring geometry (i.e. the relative interconnection of the data lines D1–D4 and D5–D8 with respect to one another), the delay values t1 and t2, and that different bits of the counters C1 and C2 are used to control the multiplexers M1–M4 and M5–M8 respectively. It will be observed, however, that if the data lines D6 and D7 in sub-block 2 are swapped, then sub-block 2 has the same wiring geometry as sub-block 1. Thus, with appropriate re-mapping of data lines between sub-blocks, it is possible to define a basic data transposition circuit, referred to herein as a transposition switch and indicated in FIG. 3b at 34, from which sub-block 1 and sub-block 2 of FIG. 3b and sub-block 1, sub-block 2 and sub-block 3 of FIG. 4b can be derived in modular fashion.

In general, the transposition switch 34 can be used to construct sub-block i, where i=1, 2, . . . log$_2$r , r being the radix of the system. The parameter i can therefore be described as the sub-block index and relates to the sub-block stage within a commutator circuit $C_r(k,s)$ A generalised commutator architecture of the present invention is shown in FIG. 5a and comprises an array of transposition circuits or switches 134, generally indicated as a generic column transposition switch 50. The function of the generic column transposition switch 50 is to reorganize input data values x(0)-x(r-1) to produce output data values x'(0)-x'(r-1), where r is the radix. Architecturally, the transposition switches 134 used in the generic column transposition switch 50 are identical to those described for FIG. 3b. In FIG. 5a, however, the delay elements 132 have a delay value of ti, which is defined below with reference to equation [1]. Each of the transposition switches 134 is controlled by bit [ctr1i] (i.e. the ctr1$i^{th}$ bit) of an up-counter Ci. The value ctrli is an integer value and is determined by the value ti, as described below with reference to equation [3]. The generic column transposition switch 50 has a synchronization signal synch_i, which is pipelined through the switch 50 via a delay element 132 and output as synch_o, as described in relation to FIG. 3*b*. It will be appreciated that the purpose of the counter Ci is to provide means for deriving a control signal for the multiplexers from the synchronization signal synch_i.

Figure 6:
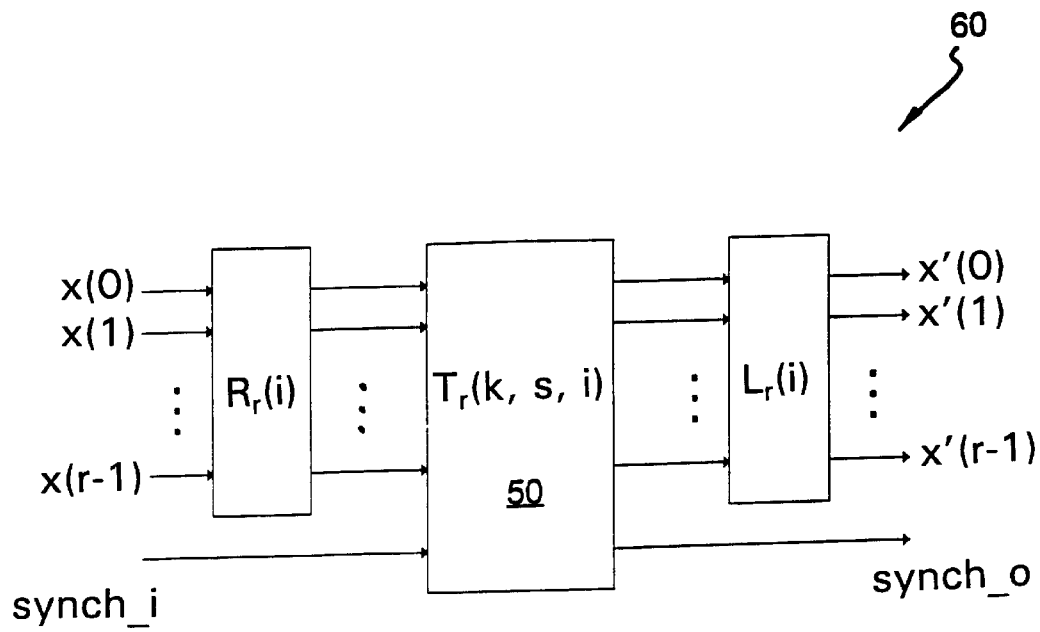
Figure 7:
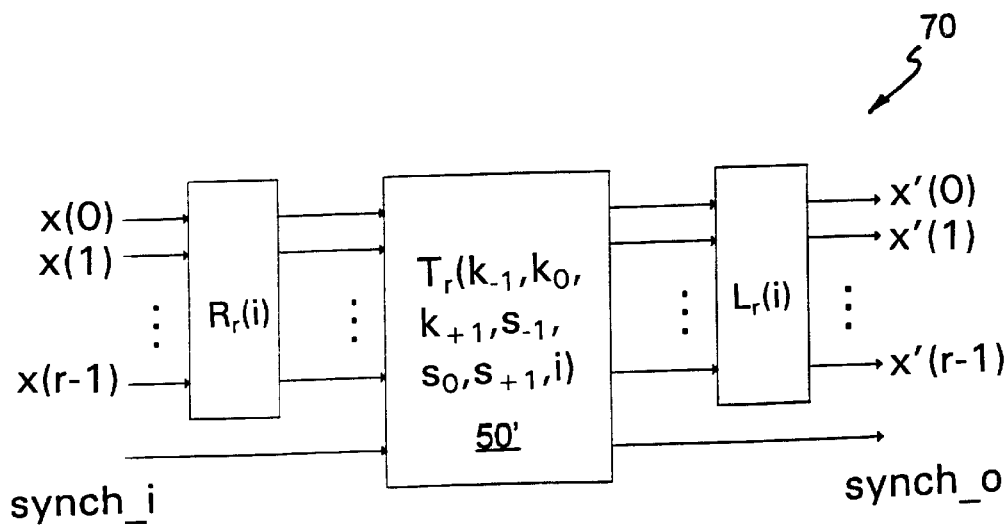
FIG. 7 is a block diagram of an alternative generalised commutator module based on the architecture of FIG. 5b.

It will be appreciated with reference to FIGS. 3*b* and 4*b* that the architecture of FIG. 5*a* can be used directly to implement sub-block 1 of a commutator circuit $C_r$ (k,s). The architecture of FIG. 5*a* can be adapted for implementing, in general, sub-block i by providing an input routing block $R_r$ (i) between the input data x(0)-x (r-1) and the column transposition switch 50 and providing an output routing block $L_r$ (i) between the column transposition switch 50 and the output data x'(0)-x' (r-1) thereby forming a generalised commutator module, the routing blocks performing any necessary re-mapping of the data outputs of each sub-block to the data inputs of the next sub-block. The generalised commutator module is illustrated in FIG. 6, generally indicated at 60. In FIG. 6, the column transposition switch 50 is denoted as $T_r$ (k,s,i) indicating that the specific characteristics of the column transposition switch 50 are dependent on the parameters k, s and i, i being the sub-block index, k and s being described below, as well as the radix r.

By way of example and with reference to FIG. 3*b*, a commutator module (not shown) which is used to implement sub-block 2, requires an input routing block $R_4$(2) which swaps data lines D6 and D7 and an output routing block $L_4$(2) which reverses the swap. In general, the input routing block $R_r$ (i) and the output routing block $L_r$ (i) swap data lines as required before said data lines are input to the column transposition switch 50 and after said data lines are output from the column transposition switch 50 respectively.

The required data line swapping to be performed by an input routing block $R_r$ (i) and an output routing block $L_r$ (i) can be derived by representing the index of each input data value x(0)-x(r-1) in binary form. This can be illustrated by considering the example of an 8-point FFT commutator circuit (not shown) constructed using the generalised commutator module 60 of FIG. 6. Here, data input values (x0, x1, x2, x3, x4, x5, x6, x7) are respectively input to the data input lines D1–D8. Before sub-block 1, no reordering of the input values is required. Before sub-block 2, the input values (x0, x1, x2, x3, x4, x5, x6, x7) are mapped to (x0, x2, x1, x3, x4, x6, x5, x7) by the input routing block $R_8$(2) and after sub-block 2 are re-arranged into their original order by the output routing block $L_8$(2) . Before sub-block 3, (x0, x1, x2, x3, x4, x5, x6, x7) are mapped to (x0, x4, x1, x5, x2, x6, x3, x7) by the input routing block $R_8$ (3) and after sub-block 3 are re-arranged into their original order by the output routing block $L_8$ (3). The mapping which input routing block $R_8$ (3) is required to perform can be derived by performing one circular-right-shift of the binary representation of each index value (0–7). For example, the mappings x3→x5 and x6→x3 correspond to the circular-right-shift of 011 to 101 and 110 to 011 respectively. To derive the mapping which input routing block $R_8$ (2) is required to perform, a circular-right-shift of the two least significant bits only is required (i.e. x6→x5 is achieved by the mapping of 110 to 101). In general, to implement the input routing block $R_r$ (i), i of the binary representation of the input data value index undergo a circular-right-shift by one bit, where i is the commutator sub-block index ranging from 1 to $\log_2 r$, r being the radix.

An output routing block $L_r$ (i) performs the reverse operation to the equivalent input routing block $R_r$ (i). Thus, an output routing block $L_r$ (i) can be derived from a one bit circular-left-shift of the i bits of the data value index.

The delay value ti is calculated as follows:

$$ti = k \cdot 2^{i-1} \cdot \text{trunc}(r^{s-1}) \quad [1]$$

where r is the radix of the system (known as the FFT radix in the case of an FFT application) and i, which takes the value 1 to $\log_2 r$, is the sub-block index. It should be noted that ti may validly take the value zero i.e. a given delay element 32, 132 need not necessarily introduce a delay into the commutator circuit 14. The 'trunc' function is used to obtain the integer value of [$\log_r$(V)] i.e. the values are rounded down to the nearest, smallest integer. In equation [1], the 'trunc' function is used to ensure that when calculated in a computer environment the value of $r^{s-1}$ is set to zero when s is zero.

The parameter k is set to either 1 or 2 depending on the manner in which data is to input to the commutator circuit which is being devised. Setting k=1 corresponds to the normal case where real and complex data are input in parallel. An alternative is to multiplex complex data so that real and imaginary data are presented to the circuit sequentially. This leads to a halving of sampling rate and so k is set to 2 to alter commutator circuit timing appropriately.

The parameter s is calculated for each sub-block i within a commutator circuit $C_r$ (k,s) and depends on the matrix transposition which a particular sub-block i is implementing (which is in turn determined by the particular FFT signal flow graph which is to be implemented by the FFT processor 10). Specifically, the parameter s is determined by the number of data values (or vector width, V) which are grouped together as a matrix element for the matrix transposition being performed by the particular sub-block i. The parameter s is calculated as:

$$s = \text{trunc}[\log_r(V)] + 1 \quad [2]$$

where V is the vector width, and is a positive value, and r is the radix. By way of example, for a radix 4, 64-point FFT transform, 64 data values are initially arranged in a main matrix (not shown) of 16 columns and 4 rows. The transposition of the matrix is to be performed in two stages by decomposing the overall transposition into two sub-transpositions, a first sub-transposition being performed by sub-block 1 of a commutator circuit $C_4$ (k,s) and a second sub-transposition being performed by sub-block 2 of $C_4$ (k,s). If, depending on the signal flow graph being implemented, the first sub-transposition is to be performed by grouping the data values in the main matrix into four sub-matrices, each sub-matrix having 16 matrix elements, then each matrix element comprises 1 data value, the vector width V is 1 and parameter s is calculated as 1. The value of s is the same for each sub-block within the commutator circuit. If, alternatively, the signal flow graph to be implemented by the commutator circuit $C_4$ (k,s) required that the main matrix be treated as one matrix of 4 columns and 4 rows, each matrix element therefore comprising 4 data values, then the vector width V is 4 and s is calculated as 2. Again, the value of s is 2 for both sub-block 1 and sub-block 2 of the commutator circuit $C_4$ (k,s). In general, the parameter s takes the same value in each sub-block i of a commutator circuit $C_r$ (k,s).

The value of ctrli is calculated as:

$$\text{ctrli} = \log_2[\text{ti}] \quad [3]$$

In general, in a radix r system, a commutator block or circuit 14 of the type shown in FIG. 1 can be constructed by cascading $\log_2 r$ commutator modules 60 together. In the particular case illustrated in FIG. 1, each commutator circuit 14 comprises two cascaded commutator modules 60.

With reference again to FIG. 1, stage 1 of the FFT processor 10 comprises a plurality of commutator circuits 14 in cascade. Such a cascade is hereinafter referred to as a multi-stage commutator circuit 16. Multi-stage commutator circuits 16 are used for input data, output data or other internal data reorganization and may therefore be located at any stage of an FFT processor, or other pipelined processor (not shown) depending on the application requirements. In FIG. 1, the FFT processor 10 receives data in natural order and outputs data in reverse order. In this case, the multi-stage commutator circuit 16 is required immediately after the input of the processor 10. If, however, an FFT processor (not shown) receives data in reverse order and is to output data in reverse order, then the multi-stage commutator circuit 16 is required to be located immediately before the output of that processor. For an FFT processor 10, the multi-stage commutator circuit 16 comprises the same number of stages as the FFT processor 10 itself i.e. $\log_r N$ stages where r is the radix and N is the transform size. For the FFT processor 10, the parameter s takes the value 1 for the first stage commutator circuit 14 within the multi-stage commutator circuit 16, the value 2 for the second stage and so on until s takes the value $\log_r N$ for the last stage of the multi-stage commutator circuit 16. Conversely, if the multi-stage commutator circuit 16 is located immediately before the output of an FFT processor (not shown) then the parameter s takes the value $\log_r N$ for the first stage commutator circuit 14, $(\log_r N)-1$ for the second stage and so on until s takes the value 1 for the last stage. In general, the parameter s is calculated for each commutator circuit 14 within a multi-stage commutator circuit 16 in the same manner as is described with reference to equation [2].

Such multi-stage commutator circuits 16 can be constructed by cascading commutator circuits 14 as shown in FIG. 1, the commutator circuits 14 comprising a number of commutator modules 60. It should be noted that, in the specific example shown in FIG. 1, the commutator circuits 14 are annotated using the general format $C_r$ (k,s) with specific values inserted for the parameters r, k and s namely, r=4, k=1 and s takes a value from 1 to w as appropriate, where w is the number of stages of the FFT processor 10.

Figure 8A:
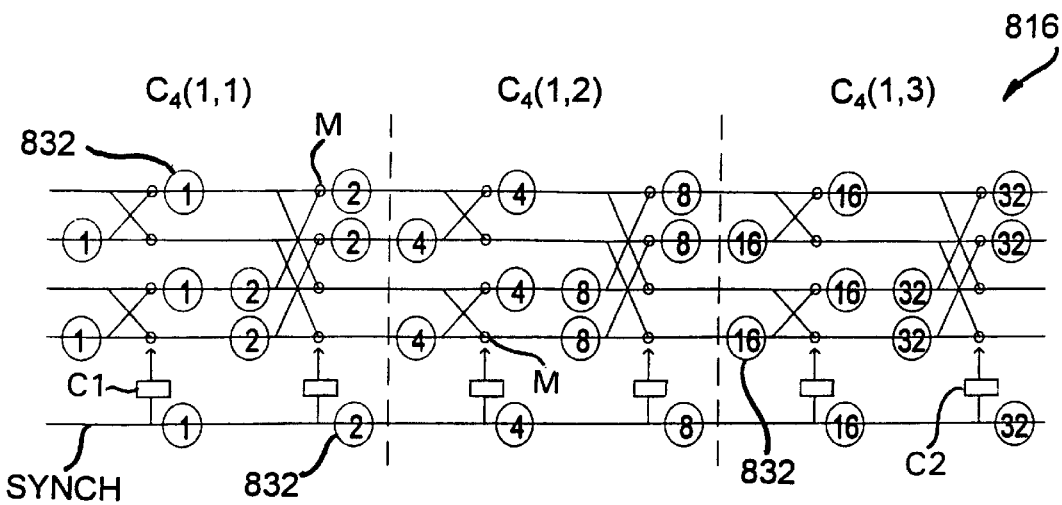
FIG. 8a is a schematic view of a radix-4 multi-stage commutator circuit constructed using the commutator circuit of FIG. 3b.
Figure 8B:
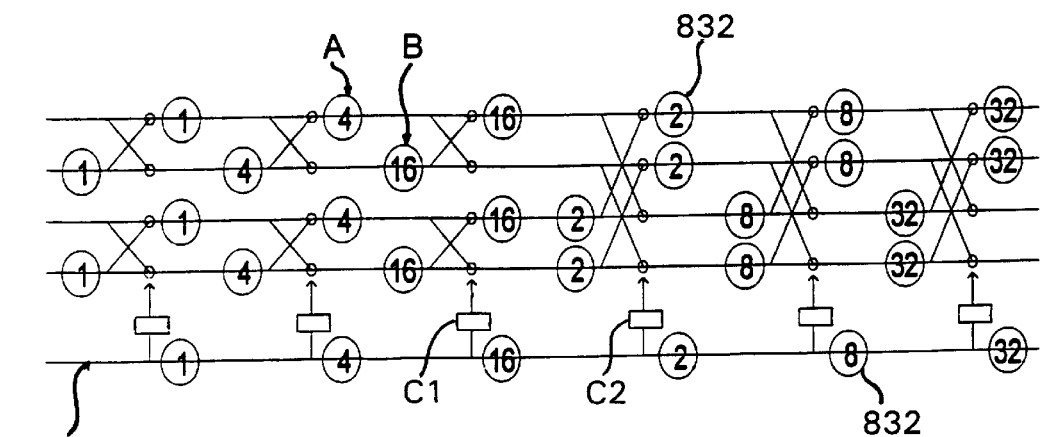
Figure 8C:
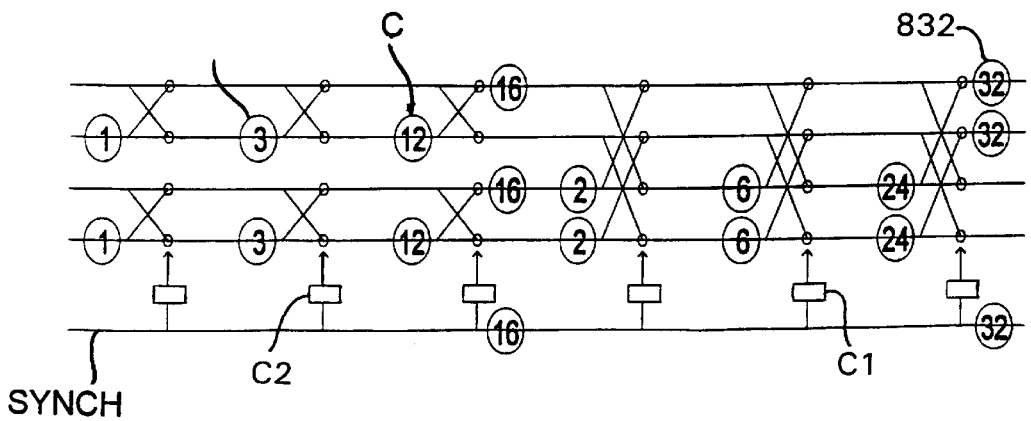
FIG. 8c is an alternative schematic view of the multi-stage commutator circuit of FIG. 8b.

It is observed, if a multi-stage commutator 16 is constructed from commutator blocks 14 which comprise a plurality of commutator modules 60, that the delay elements 32, 132 of one individual commutator circuit 14 may, in conjunction with a delay element 32, 132 of an adjacent individual commutator circuit 14, effect unnecessarily long delays in the multi-stage commutator 16. It is possible to remove unnecessary delays by re-calculating the delay values ti for the relevant delay elements 32, 132. In some cases this may mean that the delay value ti is set to zero for some delay elements 32, 132. The removal of such redundant delay values is beneficial in both hardware terms and wiring requirements and leads to a reduction in data wiring. The removal of redundant delay values is illustrated by specific example with reference to FIGS. 8a to 8c. FIG. 8a shows three radix-4 commutator circuits $C_4$ (1,1), $C_4$ (1,2) and $C_4$ (1,3) cascaded in series to form a radix-4 multi-stage commutator circuit, generally indicated at 816, for a 64-point FFT processor of the type illustrated in FIG. 1. Each commutator circuit $C_4$ (1,1), $C_4$ (1,2), $C_4$ (1,3) is of the type illustrated in FIG. 3b and is shown with specific delay values (specific values of ti) inserted for each delay element 832. FIG. 8b is an alternative view of the multi-stage commutator circuit 816 of FIG. 8a with each respective sub-block 1 of the commutator circuits $C_4$ (1,1), $C_4$ (1,2), $C_4$ (1,3) cascaded together and each respective sub-block 2 cascaded together. It can be observed that some of the delay elements 832 introduce unnecessarily long delays into the overall circuit 816. This is illustrated with reference to delay elements A and B in FIG. 8b and delay element C in FIG. 8c—the net effect of delay elements A and B can be provided by delay element C. In general, provided that data moves in the same direction along two cross-linked data lines, then, where appropriate, equal numbers of delays can be subtracted from each of said data lines. It will be appreciated that an equal number of delays must also be subtracted from corresponding portions of the SYNCH line. In practice, this removal of redundant delay values can be achieved by either setting the delay values of appropriate delay elements 32, 132 to zero or by removing the appropriate delay elements 32, 132 altogether, as illustrated in FIG. 8c.

By such observation it is deduced that the generalised commutator module 60 can be further generalised so that commutator circuits 14 and multi-stage commutators 16, 816 can be automatically produced without any redundant delay values. This leads to the definition of an alternative generalised commutator module shown in FIG. 7, generally indicated at 70. The alternative generalised commutator module 70 is characterised in that it contains parameters which describe the characteristics of those commutator modules 70 to which it is to be connected. For this reason the block is now further characterised by parameters $s_{-1}$, $s_0$ and $s_{+1}$ and by $k_{-1}$, $k_0$ and $k_{+1}$ which relate to values needed to construct the previous, current, and next-stage commutator circuits 14 respectively. As described for the commutator module 60, the commutator module 70 requires synchronization signals, synch_i and synch_o and these are pipelined, as before. The generalised commutator module 70 consists of a column transposition switch 50' (denoted in FIG. 7 as $T_r$ ($k_{-1}$, $k_0$, $k_{+1}$, $s_{-1}$, $s_0$, $s_{+1}$, i)) an input routing block $R_r$ (i) and output routing block $L_r$ (i), located at the input and output of the column-transposition-switch 50' respectively. The generalised commutator module 70 may be denoted in the form $C_r$ ($k_{-1}$, $k_0$, $k_{+1}$, $s_{-1}$, $s_0$, $s_{+1}$, i).

It is important to note that the commutator module 70 can be constructed using the same or a substantially similar column-transposition switch architecture as is illustrated in FIG. 5a. The only difference is that the delay elements 132 within the transposition switches 134 may have different delay values from one another and are calculated using the formulae set out below. The delay value of the delay element 132 which is located before the multiplexers is denoted t1i while the delay value of the delay element 132 located after one of the multiplexers is denoted as t2i as illustrated in FIG. 5b in which the column-transposition switch architecture is generally indicated at 50'. The parameters t1i and t2i and the value of ctrli are calculated as follows:

(a) if ($s_0 > s_{+1}$) then $t2i = 2^{(i-1)}$ [$K_0$.trunc($r^{(s_0-1)}$)−$k_{+1}$.trunc($r^{(s_{+1}-1)}$)] else t2i=0

(b) if ($s_0 > s_{-1}$) then $t1i = 2^{(i-1)}$ [$K_0$.trunc($r^{(s_0-1)}$)−$k_{-1}$.trunc($r^{(s_{-1}-1)}$)] else t1i=0

(c) if ($s_0 = 0$) then inputs are connected directly to the outputs (bypass mode); and (d) ctrli=$\log_2$ [$k_0.2^{(i-1)}$.trunc $r^{(s_0-1)}$]

As before, the function of the input and output routing blocks $R_r$ (i) and $L_r$ (i) is to re-order data entering or leaving the column transposition switch $T_r$ ($k_{-1}$, $k_0$, $k_{+1}$, $s_{-1}$, $s_0$, $s_{+1}$, i). The configuration of the routing blocks $R_r$ (i) and $L_r$ (i) is determined in the same way as defined for FIG. 6.

A commutator circuit 14 can be constructed from $\log_2 r$ commutator modules 70 with the parameter values calculated as described above. It will be noted that the commutator module 70 and associated formulae can be used to produce a single commutator circuit 14 as well as a multi-stage commutator circuit 16. It will be appreciated that, when constructing a single commutator circuit 14, the values of parameters $s_{-1}$, $s_{+1}$, $k_{-1}$ and $k_{+1}$ are set to zero since the single commutator circuit 14 is not connected to other commutator circuits 14. In the case of a multi-stage commutator circuit 16 many of said parameters have values which are non-zero, as can be illustrated by considering the example of a radix-4 64 point multi-stage commutator (not shown) which comprises commutator circuits $C_4$ (1,1) .$C_4$ (1,2) .$C_4$ (1,3) in cascaded order. Such a multi-stage commutator can be implemented using 6 commutator modules 70 with parameters $C_4$ (0,1,1,0,1,2,1), $C_4$ (1,1,1,1,2,3,1), $C_4$ (1,1,0,2,3,0,1), $C_4$ (0,1,1,0,1,2,2), $C_4$ (1,1,1,1,2,3,2), $C_4$ (1,1,0,2,3,0,2). It will be noted that, after the commutator modules 70 are devised for a specific application, the multi-stage commutator circuit 16 is constructed by cascading all the commutator modules 70 which correspond to the same order of sub-block together—in the case of the foregoing example, $C_4$ (0,1,1,0,1,2,1), $C_4$ (1,1,1,1,2,3,1) and $C_4$ (1,1,0,2,3,0,1), which correspond respectively to sub-blocks 1 of $C_4$ (1,1), $C_4$ (1,2) and $C_4$ (1,3), are cascaded together while $C_4$ (0,1,1,0,1,2,2), $C_4$ (1,1,1,1,2,3,2) and $C_4$ (1,1,0,2,3,0,2), which correspond to the respective sub-blocks 2, are cascaded together.

It will be noted from consideration of FIG. 8c that in a multi-stage commutator 16, it is not always necessary to pipeline the synchronizing signal synch_i between adjacent counters Ci. In such cases, it is possible to use respective output bits of one counter, or similar device, to provide the control signal for more than one commutator sub-block stage (not illustrated).

The radix-4 computational elements R4CE and the complex multipliers are generally of conventional design and are of the type normally used in the implementation of an FFT processor. A skilled person will appreciate that such radix-4 computational elements and complex multipliers can be customised to suit the needs of a particular application. In the case of an FFT processor as depicted in FIG. 1, which employs the commutator circuit 14, 16 of the present invention, it is preferred to employ flexible computational elements, based on the use of four complex adders/subtractors (not shown), which allow the user to vary the type of arithmetic required, for example, carry-ripple, look-ahead carry etc. The configuration of the R4CE is all such that the user can also change the level of pipelining in the circuit. In addition, arithmetic accuracy is desired to be preserved throughout the processor and, to this effect, rounding/truncation of data is only performed at the outputs of the R4CE elements.

In a conventional digit-serial design, the data is normally scaled (right-shifted) before performing the addition/subtraction in order to avoid overflow. This is undesirable as it introduces a scaling error even before the addition/subtraction is performed. To overcome this problem, the most-significant-bit (MSB) of each digit is sign-extended before each add/subtract operation and the final product is rounded/truncated after this has been performed.

The complex multiplier 18 comprises 4 real multipliers, one real adder and one subtractor but not shown. The real multiplier is implemented as a serial-parallel configuration, in which the multiplicand (data) enters serially, whilst the multiplier (co-efficient) bits are fed in parallel. The complex multiplier can also be implemented using merged arithmetic.

It is preferred that all co-efficients required by the complex multiplier 18 are stored in a ROM (not shown) and fed in parallel to the complex multiplier 18.

The commutator architectures 30, 40, 50, 50' the commutator modules 60, 70, the commutator circuits 14, the multi-stage commutator circuits 16 and the FFT processors 10 according to the present invention can be implemented by, for example, using generic declarations in a hardware description language, such as VHDL, together with suitable synthesis tools, such as those manufactured by Synopsys Inc. of San Jose, U.S.A. Then a corresponding layout is created using, for example, a standard cell library and layout tools such as those manufactured by Cadence Inc. of San Jose, U.S.A. to ultimately produce a microchip designs which is portable across a wide range of silicon technologies.

The time required to produce an FFT processor 10, or other processor incorporating one or more commutator circuit 14, 16, is determined mainly by the time required to perform the synthesis and layout processes with the design tools. Thus, by way of example, an FFT processor for performing a 16-point FFT operating on 8 bit wide complex input data (8 bits real, 8 bits imaginary) can be implemented on 0.6 um double level metal CMOS in approximately one day while an FFT processor for performing a 64-point FFT transform on 16 bit complex data (16 bit real and 16 bit imaginary), designed with an internal (complex) word length of 24 bits to cater for word growth, can be designed in approximately one week. It will be noted that to produce an FFT processor comparable to the latter using conventional techniques would typically require one to two engineer years.

The equations presented herein for ti, ctrli, s, t1i and t2i hold for the situations where the transform size N is an integer power of the radix r, e.g. for r=4, the equations hold for N=4, 16, 64 . . . The same commutator circuits 14, multi-stage commutator circuits 16 and commutator modules 60, 70 are also suitable, however, for use with other transform sizes N upon adaptation of the equations (not illustrated).

In alternative embodiments of the invention (not shown) the commutator circuit need not necessarily comprise the commutator architecture 50, 50' of FIGS. 5a and 5b. In the broadest sense, a data transposition circuit for use in a commutator circuit of the present invention is required to comprise at least two data lines, and two 2-to-1 multiplexers mutually arranged as illustrated for the transposition switches 34, 134. In addition, the architecture requires at least one delay element. Depending on the application, the at least one delay element can be located in either data line and on either one side or the other side of one or other of the multiplexers. The architecture further requires an input for synchronizing signals and means, such as an up-counter, for deriving from the synchronizing signals a control signal for the multiplexers.

The techniques used to derive the commutator circuit 14, 16 of the present invention can be used to derive commutator circuits for the silicon implementation of many FFT signal flowgraphs. For illustrative purposes, and because of the ensuing benefits in processor utilisation, the foregoing has focused on digit serial systems based on the DIF FFT processor depicted in FIG. 1. However, using similar techniques, a commutator circuit (not shown) can be devised for other related FFT circuits, since the overall commutator delay requirements are independent of the data word format (i.e. bit parallel, bit serial, digital serial etc). Such other related FFT circuits do not necessarily comprise the same computational processors 12. It should be noted, however, that the same generic commutator modules used to create the systems described in the foregoing, can also be used to construct the commutator circuits required in other comparable or related FFT systems. Differences in word widths can readily be accommodated by ensuring that the widths of I/O buses within each commutator circuit have the appropriate values and that each of these bit lines contain the required number of delays as defined by the formulae given earlier.

Commutator circuits (not shown) according to the present invention are not limited to use in FFT applications. It is envisaged that the commutator circuits can be used in the computation of other mathematical operations such as the discrete sine and cosine transforms and in many image processing applications, particularly where pixel reordering is required. For such applications the formulae for ti, t1i, t2i and ctrli must be re-defined (not shown).

The commutator circuits 14, 16 are devised for use with fixed point arithmetic. The commutator circuit of the invention is also suitable for use with floating point arithmetic.

What is claimed is:

1. A commutator circuit comprising at least one data transposition circuit connected between a pair of data inputs and a pair of data outputs, the data transposition circuit including two 2-to-1 selector switches each having two inputs connected to respective ones of the pair of data inputs and a single output connected to a respective one of the pair of data outputs, and a delay element connected in series with one of the data inputs and/or one of the data outputs, the commutator circuit further comprising an input for synchronizing signals and means for deriving from the synchronizing signals a control signal for the selector switches, wherein the commutator circuit comprises a plurality of stages connected in series, each stage having a plurality of data inputs and a like plurality of data outputs with the data outputs of each stage except the last being connected in one-to-one correspondence to the data inputs of the next stage, and wherein each stage comprises a plurality of the said data transposition circuits each connected between a respective pair of the data inputs and a respective pair of the data outputs for that stage, the commutator circuit further comprising means associated with each stage for deriving from the synchronizing signals a control signal for the selector switches of that stage.

2. A commutator circuit according to claim 1, wherein in at least one stage each data transposition circuit includes a first delay element connected between one of the data inputs and the two selector switches, and a second delay element connected to the output of one of the selector switches.

3. A commutator circuit as claimed in claim 1, wherein a synchronizing signal is supplied to the first stage each time a fresh set of data is present at the data inputs of the first stage, wherein the synchronizing signal is passed from each stage to the next via a further delay element, and wherein each stage includes a counter which counts the synchronizing signals and provides a control signal for the selector switches of that stage according to the state of the counter.

4. A commutator circuit as claimed in claim 1, further including means for re-mapping the data outputs of each stage to the data inputs of the next stage.

5. An FFT processor including at least one commutator circuit as claimed in claim 1.

* * * * *